United States Patent
Kim et al.

(10) Patent No.: US 9,743,434 B2
(45) Date of Patent: Aug. 22, 2017

(54) METHOD AND DEVICE FOR FAST LINK SYNCHRONIZATION IN WLAN SYSTEM

(71) Applicant: LG Electronics Inc., Seoul (KR)

(72) Inventors: Jeongki Kim, Anyang-si (KR); Hangyu Cho, Anyang-si (KR); Giwon Park, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,281

(22) PCT Filed: Oct. 29, 2013

(86) PCT No.: PCT/KR2013/009671
§ 371 (c)(1),
(2) Date: Apr. 29, 2015

(87) PCT Pub. No.: WO2014/069870
PCT Pub. Date: May 8, 2014

(65) Prior Publication Data
US 2015/0296544 A1    Oct. 15, 2015

Related U.S. Application Data

(60) Provisional application No. 61/719,965, filed on Oct. 30, 2012.

(51) Int. Cl.
*H04W 76/02* (2009.01)
*H04W 56/00* (2009.01)
(Continued)

(52) U.S. Cl.
CPC .............. *H04W 76/02* (2013.01); *H04B 1/38* (2013.01); *H04W 56/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2004/0008661 A1* | 1/2004 | Myles | H04J 3/0664 370/350 |
| 2004/0103282 A1* | 5/2004 | Meier | G06Q 20/3674 713/171 |

(Continued)

FOREIGN PATENT DOCUMENTS

| | | |
|---|---|---|
| EP | 2073589 | 6/2009 |
| WO | 2012078007 | 6/2012 |

OTHER PUBLICATIONS

Yunbo Li, et al., "AP discovery with FILS beacon," IEEE 802.11-12/0042r2, Mar. 6, 2012, see slide 7.

*Primary Examiner* — Huy D Vu
*Assistant Examiner* — James P Duffy
(74) *Attorney, Agent, or Firm* — Dentons US LLP

(57) ABSTRACT

The present invention relates to a wireless communication system, and more specifically, a method and a device whereby a station (STA) performs link setup with an access point (AP) in a WLAN system are disclosed. The method according to one embodiment of the present invention comprises: a step in which an STA receives a first frame related to link setup from an AP in a wireless communication system; and a step in which a second frame related to association is transmitted to the AP, wherein the first frame is a fast initial link setup (FILS) discovery frame and the second frame may comprise timestamp request information in case an AP configuration change count (CCC) value the STA has and an AP CCC value included in the received first frame are determined to be the same.

7 Claims, 11 Drawing Sheets

(51) Int. Cl.
*H04B 1/38* (2015.01)
*H04W 84/12* (2009.01)

(56) References Cited

U.S. PATENT DOCUMENTS

| | | | |
|---|---|---|---|
| 2004/0205158 A1* | 10/2004 | Hsu | H04W 48/18 |
| | | | 709/218 |
| 2005/0128988 A1 | 6/2005 | Simpson et al. | |
| 2007/0049339 A1* | 3/2007 | Barak | H04W 88/06 |
| | | | 455/557 |
| 2010/0265895 A1 | 10/2010 | Bracha | |
| 2013/0176897 A1* | 7/2013 | Wang | H04W 12/06 |
| | | | 370/254 |

\* cited by examiner

METHOD AND DEVICE FOR FAST LINK SYNCHRONIZATION IN WLAN SYSTEM

FIELD OF THE INVENTION

The following description relates to a wireless communication system and, most particularly, to a method and device for fast link setup in a wireless LAN (WLAN) system.

BACKGROUND ART

With the recent development in the information communication technology, diverse wireless (or radio) communication technologies have also been under development. Among such technologies, Wireless LAN (WLAN) corresponds to a technology allowing wireless access to the Internet in households, companies, or specific service provided areas by using mobile user terminals (or user equipments), such as a Personal Digital Assistant (PDA), a laptop computer, a Portable Multimedia Player (PMP), and so on, based upon a radio frequency technology.

In order to overcome the limitations in the communication rate (or communication speed), which has been noted as a vulnerability in WLAN, in the most recent technology standard, a system that has enhanced network speed and reliability and that has extended the operation range of a wireless network has been applied. For example, IEEE 802.11n supports a High Throughput (HT) having a maximum data processing rate of 540 mbps or more and also adopts the application of a MIMO (Multiple Inputs and Multiple Outputs) technology, which minimizes transmission error, and which uses multiple antennae at both transmitting and receiving units in order to optimize the data rate.

In a MAC (Medium Access Control) layer of an IEEE 802.11 group system, a new standard for supporting fast initial link setup with respect to stations (STAs), which support the IEEE 802.11 group, is being developed as IEEE 802.11ai. In a situation where a significantly large number of users deviate from their initially connected and WLAN coverage and substantially access a new WLAN at the same time, such as during public transportation transfer, an object of the IEEE 802.11ai, for example, is to provide a technology for supporting link setup at a fast rate. Furthermore, the main features of IEEE 802.11ai may be summarized as a security framework, an IP address assignment, fast network discovery, and so on.

DETAILED DESCRIPTION OF THE INVENTION

Technical Objects

As described above, a technology for providing a fast link setup (or fast session setup) in a case when a significantly large number of users substantially attempts network connection at the same time or in a case when a significantly large number of user equipments substantially performs a random access process at the same time, and so on, is being required. However, a detailed solution for such fast link setup is yet to be provided.

In this specification, a technical object will be to provide a solution for synchronizing a STA and an AP during a link setup procedure by enhancing operations of the station (STA) for establishing a link setup with the access point (AP).

The technical objects of the present invention will not be limited only to the objects described above, and, accordingly, other technical objects that have not been mentioned above may become apparent to those having ordinary skill in the art from the description presented below.

Technical Solutions

In an aspect of the present invention, a station (STA) performing link setup with an access point (AP) by the STA in a wireless communication system, receiving a first frame related to link setup from an AP in a wireless communication system, and transmitting a second frame related to association to the AP. If the first frame is a fast initial link setup (FILS) discovery frame, and an AP configuration change count (CCC) value of the STA is identical to an AP CCC value included in the received first frame, the second frame comprises timestamp request information.

In an aspect of the present invention, receiving a third frame from the AP as a response to the second frame.

In an aspect of the present invention, the third frame includes at least one or more of Timestamp information and Timing Synchronization Function (TSF) information of the AP.

In an aspect of the present invention, the second frame is transmitted by the STA before receiving a beacon frame being transmitted by the AP.

In an aspect of the present invention, the second frame is an Association Request frame, and the third frame is an Association Response frame.

In an aspect of the present invention, a station (STA) performing Fast Initial Link Setup (FILS) in a wireless communication system, receiving, by the station (STA), a first frame from an access point (AP), transmitting, by the STA, a second frame to the AP, receiving, by the STA, a third frame from the AP, receiving, by the STA, a fourth frame including Timestamp information from the AP, and synchronizing with the AP by using the received Timestamp information.

In an aspect of the present invention, the fourth frame is received by the STA at a next Target Beacon Transmission Time (TBTT) of the AP.

In an aspect of the present invention, the fourth frame is received by the STA at a beacon frame reception time point after a next TBTT of the AP.

In an aspect of the present invention, the beacon frame reception time point after the next TBTT of the AP corresponds to a time point that is acquired by calculating a reception point of a beacon frame transmitted by the AP based upon a Beacon interval and a next TBTT respective to the corresponding AP that are pre-stored in the STA.

In an aspect of the present invention, the STA shifts to a Power Saving mode immediately after establishing association with the AP.

In an aspect of the present invention, the first frame is a Fast Initial Link Setup (FILS) discovery frame, the second frame is an Association Request frame, the third frame is an Association Response frame, and the fourth frame is a Beacon frame.

Advantageous Effects

According to the present invention, by enhancing operations allowing the station (STA) to access the access point (AP), a method and device for synchronizing a STA and an AP during link setup may be provided.

The effects of the present invention will not be limited only to the effects described above, and, accordingly, other effects that have not been mentioned above may become apparent to those having ordinary skill in the art from the description presented below.

BRIEF DESCRIPTION OF THE DRAWINGS

Being given to provide a more detailed understanding of the present invention, the drawings accompanying the description of the present invention illustrate diverse exemplary embodiments of the present invention and are being provided to describe the principles of the present invention along with the description of the present invention.

BEST MODE FOR CARRYING OUT THE PRESENT INVENTION

Figure 1:
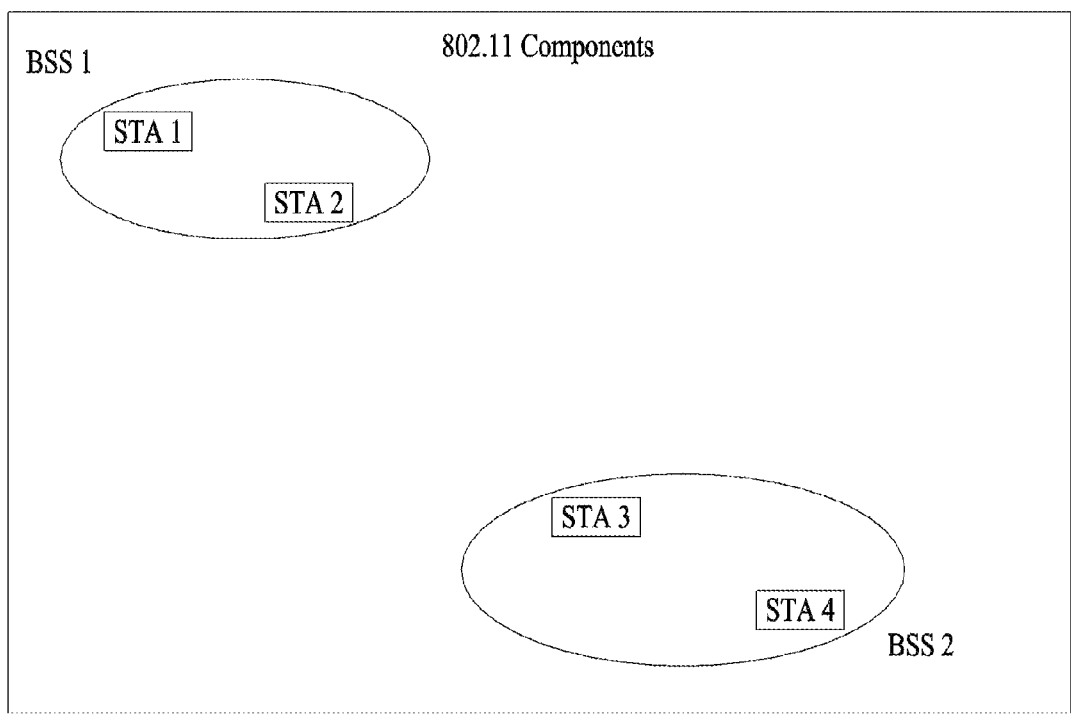
FIG. 1 illustrates an exemplary structure of an IEEE 802.11 system to which the present invention can be applied.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary structure of an IEEE 802.11 system to which the present invention can be applied.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it may no longer communicate directly with other members of the BSA.

An Independent Basic Service Set (IBSS) is the most basic type of BSS in the IEEE 802.11 LAN. For example, a minimum IBSS includes only two stations. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
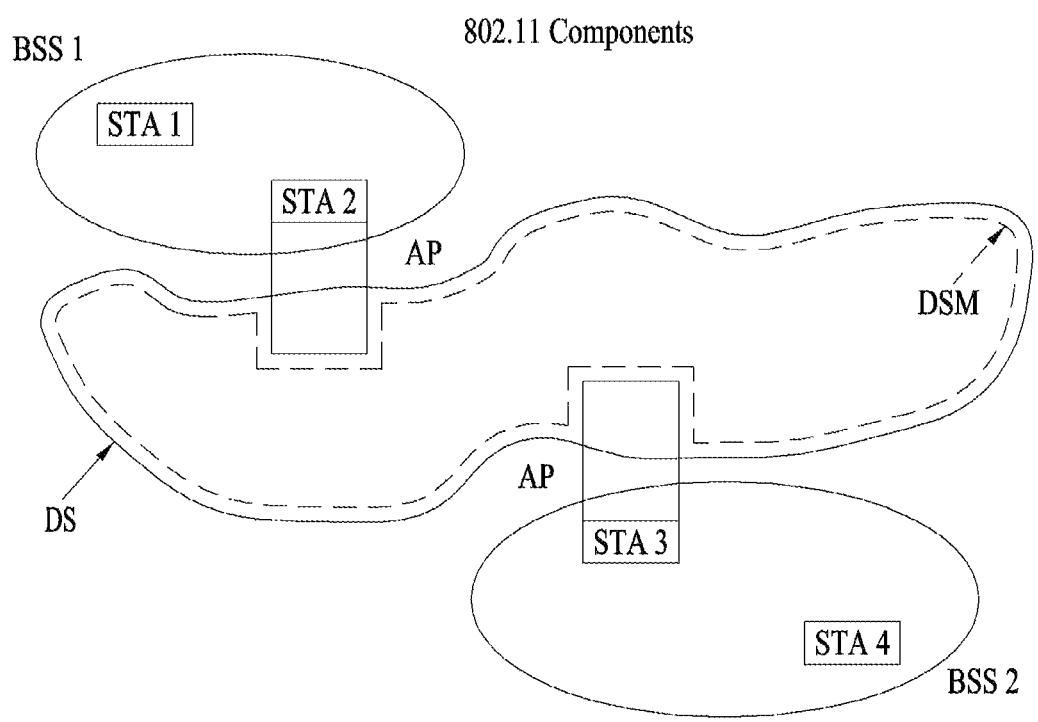
FIG. 2 illustrates another exemplary structure of an IEEE 802.11 system to which the present invention can be applied.

FIG. 2 illustrates another exemplary structure of an IEEE 802.11 system to which the present invention can be applied. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media is logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An Access Point (AP) is an entity that enables its associated STAs to access a DS through a WM and that has STA functionality. Data may move between the BSS and the DS through the AR For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. Transmission data (or frames) may be transmitted to the DS when a controlled port is authenticated.

Figure 3:
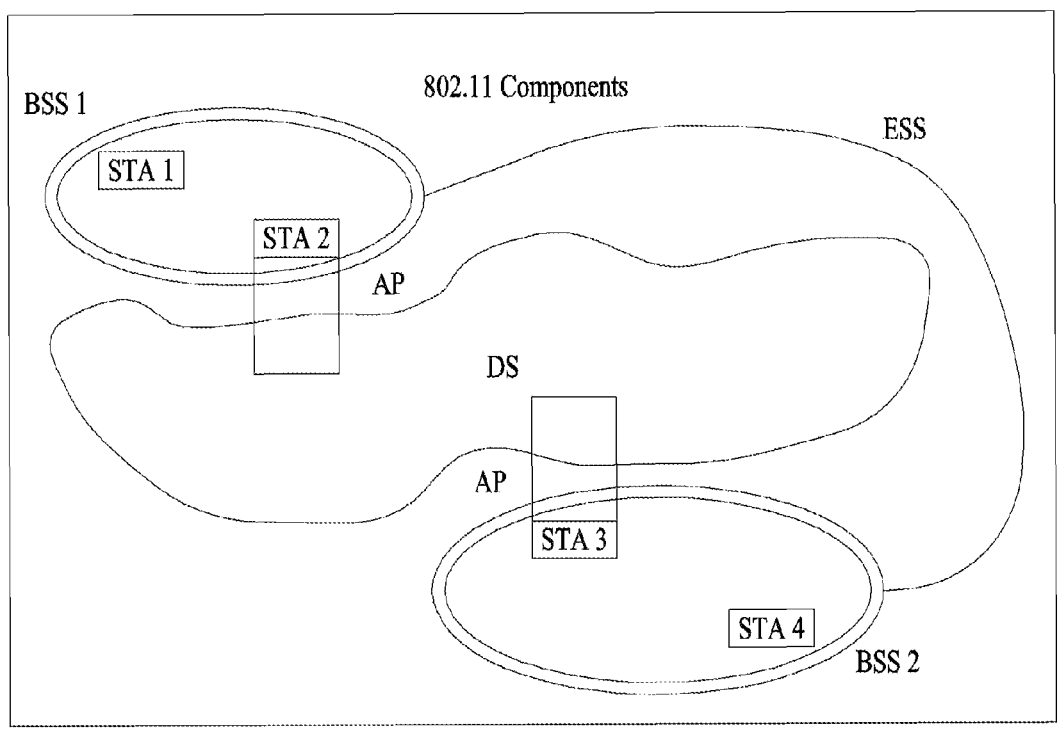
FIG. 3 illustrates yet another exemplary structure of an IEEE 802.11 system to which the present invention can be applied.

FIG. 3 illustrates yet another exemplary structure of an IEEE 802.11 system to which the present invention can be applied. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
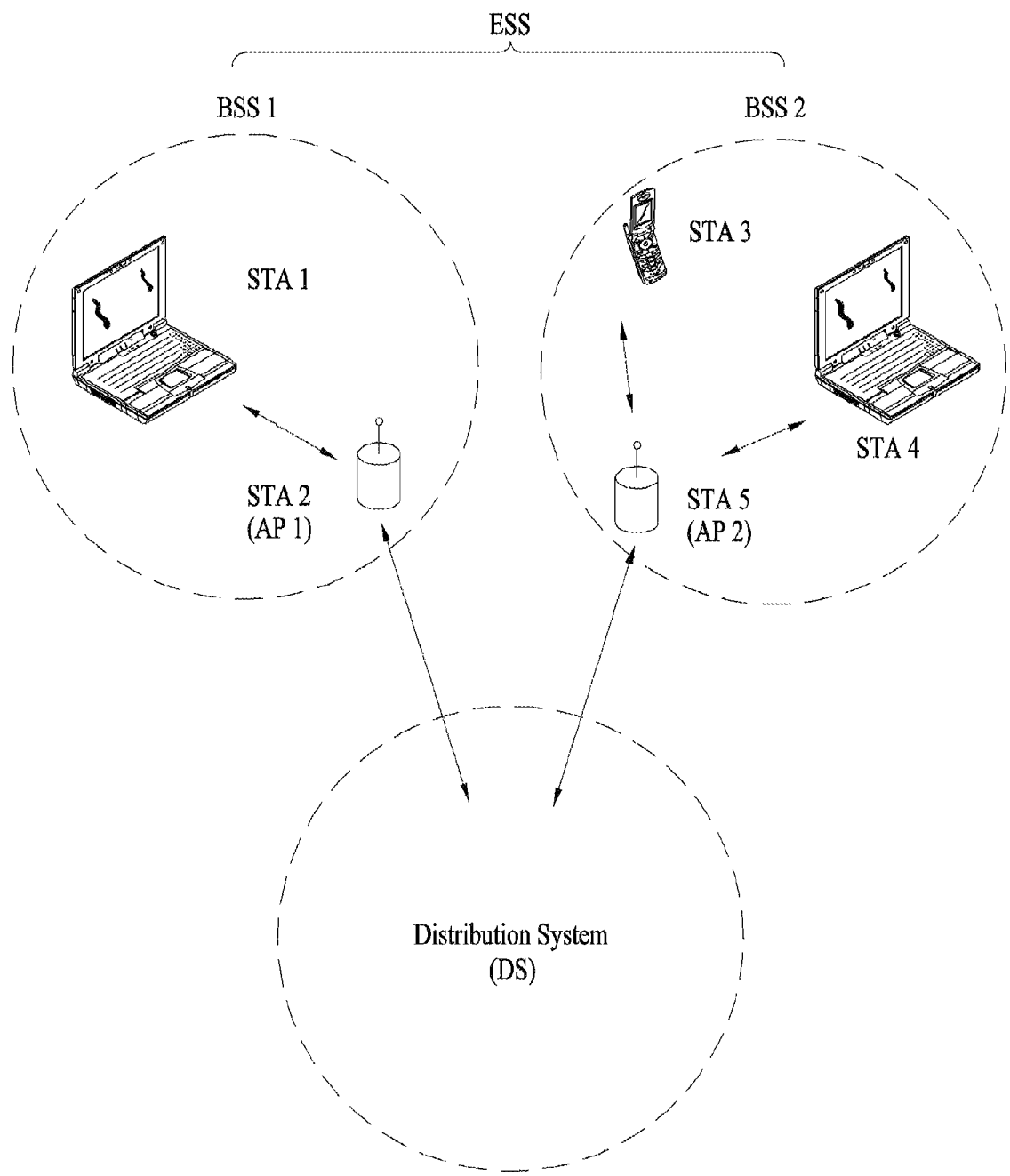
FIG. 4 illustrates an exemplary structure of a WLAN system.

FIG. 4 illustrates an exemplary structure of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
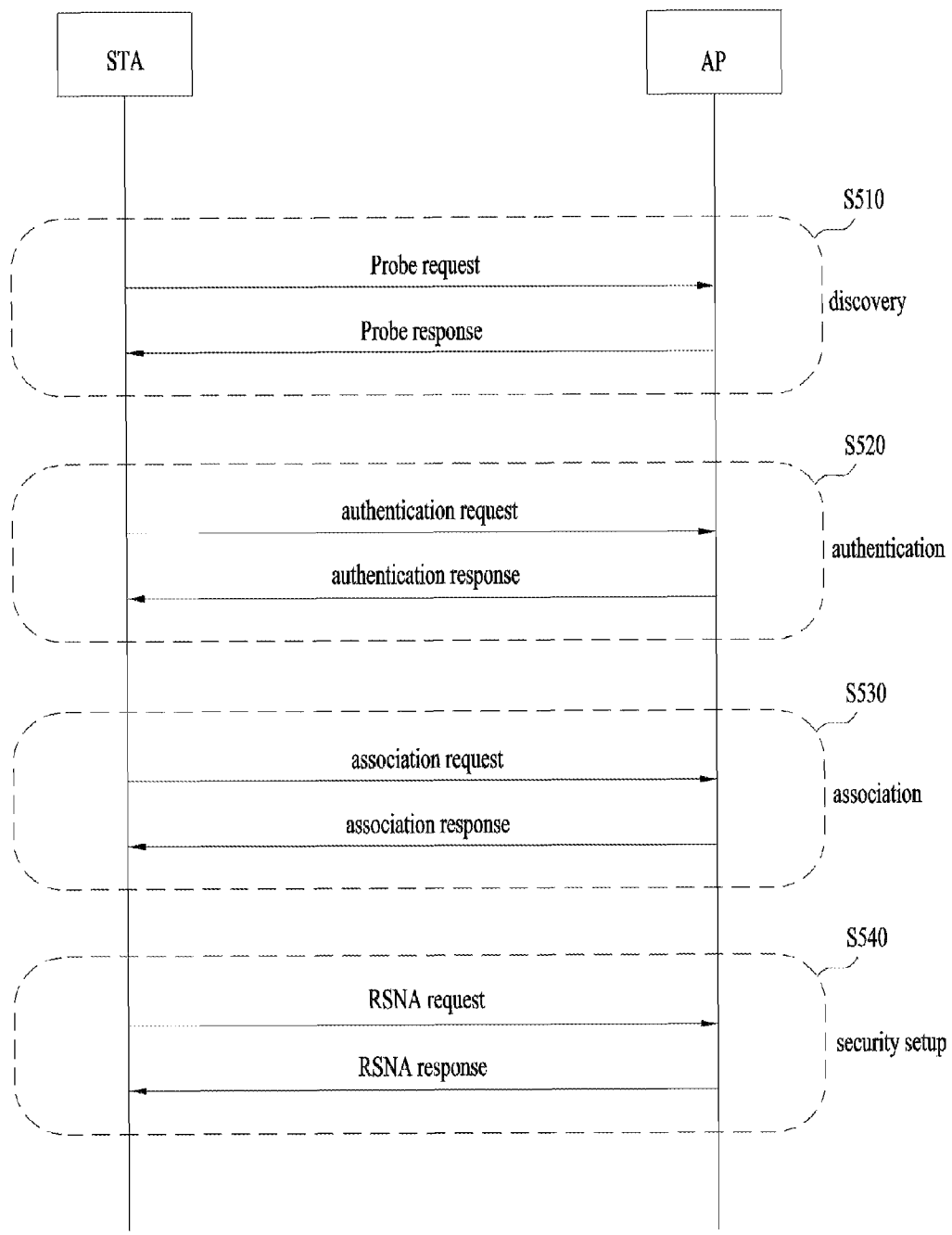
FIG. 5 illustrates a general link setup procedure.

FIG. 5 illustrates a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame. it includes information such as below tables.

TABLE 1

| Order | Information | Notes |
|---|---|---|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |
| 14 | Element | A field element from a finite field encoded. This is present in SAE authentication frames |
| 15 | Confirm | An unsigned integer encoded. This is present in SAE authentication frames |
| Last | Vendor Specific | One or more vendor-specific elements are optionally present. These elements follow all other elements. |

In Table 1, an authentication algorithm number field indicates a single authentication algorithm and has a length of 2 octets. For instance, values of the authentication algorithm number field 0, 1, 2 and 3 indicate an open system, a shared key, a fast BSS transition and SAE (simultaneous authentication of equals), respectively.

An authentication transaction sequence number field indicates a current status among transaction (or process) of a plurality of steps and has a length of 2 octets.

A status code field is used in a response frame, indicates whether a requested operation (e.g., an authentication request) is successful or failure and has a length of 2 octets.

A challenge text field includes a challenge text in authentication exchange and a length of the challenge text field is determined according to an authentication algorithm and a transaction sequence number.

An RSN (robust security network) field includes cipher-related information and has a length of maximum 255 octets. An RSNE (RSN element) is included in a FT (fast BSS transition) authentication frame. A mobility domain field includes a mobility domain identifier (MD ID) and FT capability and policy field. The mobility domain field can be used to advertise an AP group (i.e., a set of APs constructing a mobility domain) to which an AP belongs thereto. A fast BSS transition field includes information necessary for performing a FT authentication sequence while a fast BSS transition is performed in an RSN. A timeout interval field includes a reassociation deadline interval. A resource information container (RIC) field corresponds to a set of one or more elements related to a resource request/response. The RIC field can include elements (i.e., elements indicating a resource) of a variable number.

A finite cyclic group field indicates a cryptographic group used in SAE exchange and has an integer value not including a sign (unsigned) indicating a finite cyclic group. An anti-clogging token field is used for SAE authentication to protect denial-of-service and is configured by a random bit string. A send-confirm field is used for response prevention in SAE authentication and has a binary-coded integer value. A Scalar field is used to give and take cipher-related information in SAE authentication and has an integer value not including an encoded sign. An element field is used to give and take an element of a restricted field in SAE authentication. A confirmation field is used to verify possession of an encryption key in SAE authentication and has an integer value not including an encoded sign.

A vendor specific field can be used for vendor-specific information not defined by IEEE 802.11 standard.

Table 1 shown in the foregoing description shows a partial example of information capable of being included in an authentication request/response frame. Additional information can be further included in Table 1.

For instance, an STA can transmit an authentication request frame consisting of one or more fields of Table 1 to an AP. The AP can determine whether to permit authentication for the STA based on information included in the received authentication request frame. For instance, the AP can provide a result of the authentication process to the STA via an authentication response frame consisting of one or more fields shown in Table 1.

After the STA is successfully authenticated, an association process can be performed in the step S530. The association process includes processes that the STA transmits an association request frame to the AP and the AP transmits an association response frame to the STA in response to the association request frame.

For instance, the association request frame can include information on various capabilities and information on a beacon listening interval, an SSID (service set identifier), supported rates, supported channels, an RSN, a mobility domain, supported operating classes, a TIM (traffic indication map) broadcast request, interworking service capability and the like.

For instance, the association response frame can include information on various capabilities and information on a status code, an AID (association ID), supported rates, EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS map and the like.

The above mentioned example shows a partial example of information capable of being included in the association request/response frame. Additional information can be further included in the association request/response frame.

After the STA is successfully associated with a network, a security setup process can be performed in the step S540. The security setup process performed in the step S540 may correspond to an authentication process performed via an RSNA (robust security network association) request/response. The authentication process performed in the step S520 can be called a first authentication process and the security setup process performed in the step S540 can be simply called an authentication process.

For instance, the security setup process performed in the step S540 can include a process of performing a private key setup via 4-way handshaking via through an EAPOL (extensible authentication protocol over LAN) frame. The security setup process can be performed according to a security scheme not defined by IEEE 802.11 standard.

Figure 6:
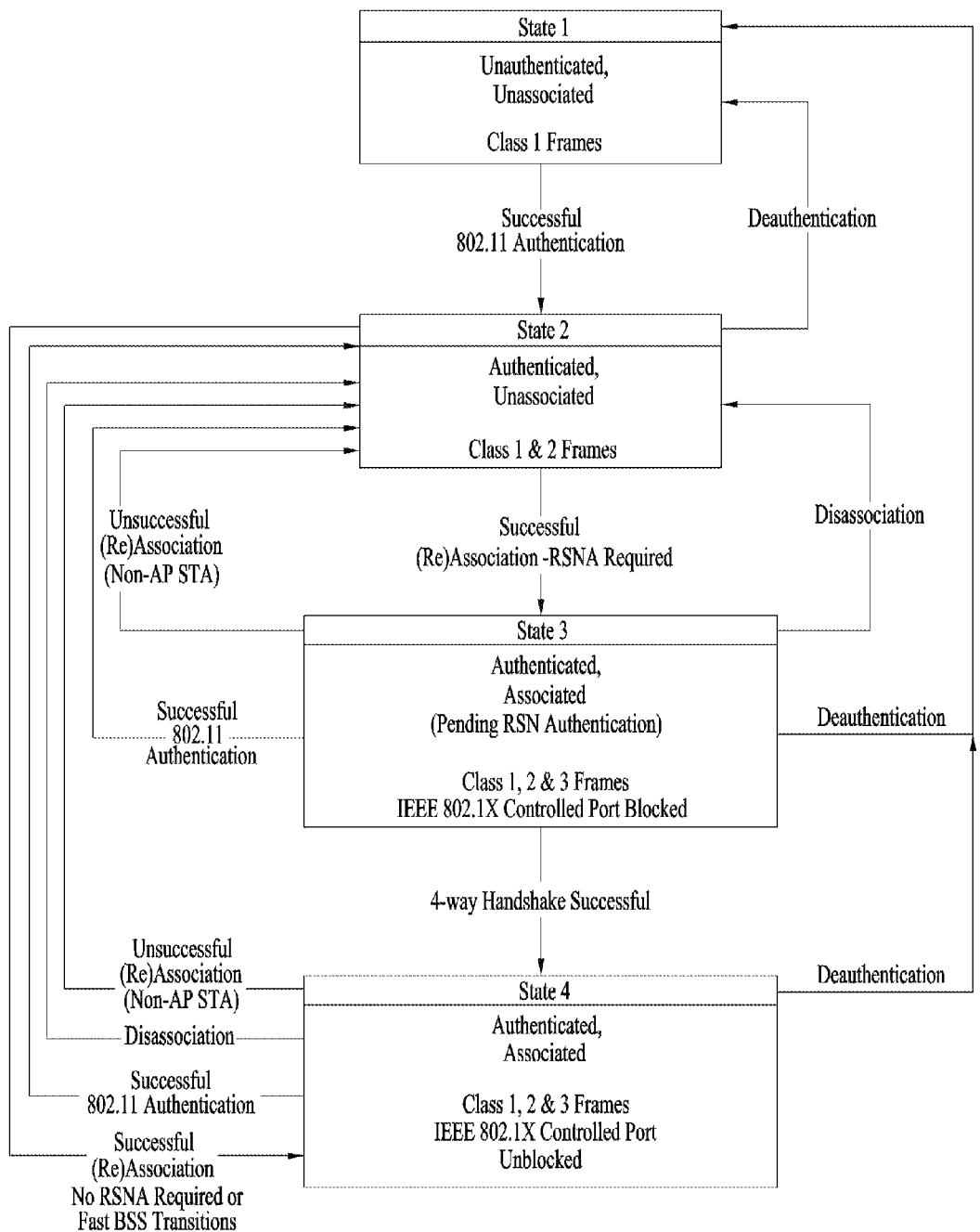
FIG. 6 illustrates a concept of a status transition of a STA.

FIG. 6 is a conceptual diagram for explaining a status transition of an STA. In FIG. 6, for clarity, events causing a state change are shown only.

A state 1 corresponds to a state that an STA is unauthenticated and unassociated. The STA of the state 1 can transceive class 1 frames only with a different ST. For instance, a class 1 frame includes a management frame including a probe response/request frame, a beacon frame, an authentication frame, a de-authentication frame and the like.

If the STA of the state 1 is successfully authenticated (e.g., authentication corresponding to the step S520 in FIG. 5), a state of the STA is changed to a state 2. In particular, although the state 2 is authenticated, the STA is in an unassociated state. In this case, the STA can transceive class 1 and 2 frames only with a different STA. For instance, a class 2 frame includes a management frame including an association request/response frame, a reassociation request/response frame, a dissociation frame and the like.

If the STA of the state 2 is de-authenticated, the STA returns to the state 1. When the STA of state 2 is successfully associated, if an RSNA is not requested, if a fast BSS transition is performed, the state 2 is directly changed to a state 4.

Meanwhile, if the STA of the state 2 is successfully associated (or re-associated), a state of the STA is changed to a state 3. In particular, the state 3 corresponds to an authenticated and associated state but the state that RSNA authentication (e.g., security setup corresponding to the step S540 of FIG. 5) is not completed yet. Although the STA of the state 3 can transmit class 1, 2 and 3 frames, IEEE 802.1x control port is in a blocked state. The class 3 frame includes a management frame including a data frame, an action frame and the like, a control frame including a block ACK frame, and the like transceived between STAs in an infrastructure BSS.

If the STA of the state 3 is dissociated or fails to associate, the STA returns to the state 2. If the STA of the state 3 is de-authenticated, the STA returns to the state 1.

If the STA of the state 3 successfully performs 4-way handshaking, the state of the STA is changed to a state 4. The STA of the state 4 corresponds to an authenticated and associated state and is able to transmit a class 1, 2 and 3 frames. The state 4 corresponds to a state that the IEEE 802.1x control port is unblocked.

If the STA of the state 4 is dissociated or fails to associate, the STA returns to the state 2. If the STA of the state 4 is de-authenticated, the STA returns to the state 1.

FILS Discovery (Fast Initial Link Setup Discovery) Frame

A FILS discovery frame includes information for supporting a procedure of performing fast AP or network discovery for a fast initial link setup. The FILS discovery frame may be transmitted by an STA transmitting a beacon frame. The FILS discovery frame corresponds to a broadcast MAC management frame. As a non-HT duplicate PPDU, the FILS discovery frame may be transmitted at 20 MHz of 20, 40, and 80 MHz bands and at 160 MHz of a 5 GHz band. The FILS discovery frame may be periodically and/or aperiodically transmitted in-between beacon frames. In case of being periodically transmitted, a periodic cycle period of the FILS discovery frame may be changed, and an interval between a beacon frame and a FILS discovery frame may not be shorter than a minimum interval between beacon frames. The FILS discovery frame is not transmitted during a minimum interval between a FILS discovery frame and a beacon frame prior to a TBTT of a transmitter, and the FILS discovery frame is also not transmitted after a beacon frame transmission. The FILS discovery frame may include information, which is shown below in Table 2.

While performing scanning, when the STA receives a FILS discovery frame and decodes the received frame, the FILS discovery frame may be used as information described below. In case an SSID within the FILS discovery frame matches with a SSID parameter or with a SSID of a SSID list parameter within a MLME-SCAN.request primitive, or in case a Reporting Option within the MLME-SCAN.request is set-up as an IMMDIATE value, the MLME issues the information acquired from the received FILS discovery frame as a MLME-SCAN.confirm primitive.

beacon. Since the beacon frame has not been received, a problem may occur in that the STA cannot establish synchronization with the AP. Due to an absence of the synchronization process, in the power saving mode, a problem of STA malfunction, such as inaccuracy in the time point of beacon frame reception, may occur.

In the present invention, during the process of having the STA discovery an AP and associate with the AP, by enhancing the synchronization process, a solution for resolving the above-described problems will hereinafter be proposed.

Embodiment 1

This exemplary embodiment proposes a synchronization method corresponding to when the STA receives a FILS discovery frame, and when the STA immediately performs the association procedure with the AP without receiving any beacon frame.

TABLE 2

| Name | Type | Valid range | Description |
|---|---|---|---|
| BSSID | MAC Address | N/A | The BSSID of the found BSS |
| SSID | Octet String | 0-32 octets | The SSID of the found BSS |
| FD Capability | Capability information field carried in FD frame | | The advertised capabilities of the BSS in the FD frame. This parameter is optional. |
| FD Security | Security information field carried in FD frame | | The advertised security features supported by the BSS in the FD frame. This parameter is optional. |
| Access Network Options | Access Network Options information field | As defined in 8.4.2.94 | The advertised access network options of the BSS. This parameter is optional. |
| AP Configuration Change Count | Integer | | The value of the Configuration Change Count in the BSS. This parameter is optional. |
| AP's Next TBTT | Integer | | The information of next Target Beacon. Transmission Time of the found BSS. This parameter is optional. |
| Neighbor AP Next TBTT | Neighbor AP Next TBTT Information field | | The Next TBTT information of neighbor BSSs of the found BSS. This parameter is optional. |
| GAS configuration sequence number | Integer | N/A | The GAS configuration sequence number of the found BSS |

Enhanced Link Setup Procedure

In a link setup method, which is defined in the current wireless communication system (e.g., WLAN system), as described above, message exchange should be performed through beacon or probe request/response (i.e., network discovery operation), authentication request/response (i.e., first authentication operation), association request/response (i.e., association operation), and RSNA request/response (i.e., authentication operation).

In a legacy system (802.11a/b/g/n/ac, and so on), the STA receives a beacon or probe request message from a specific AP, and, then, the STA establishes synchronization with the AP based upon Timestamp information, which is included in the beacon frame or probe response message. In the IEEE 802.11ai system, the AP periodically or aperiodically transmits Fast Initial Link Setup (FILS) discovery frame, so that the STA can quickly discovery a network or AP. The STA receives the FILS discovery frame and may know which AP exists. At this point, the STA compares its own AP Configuration Change Count (CCC) with an AC CCC, which is included in the FILS discovery frame that is received from the AP. In case the two values are the same (or identical), and in case system information respective to the corresponding AP is stored therein, the STA may immediately perform an association operation with the AP without receiving any As a synchronization procedure with respect to an association between a station (STA) and an access point (AP), the AP transmit a FILS discovery frame being associated to link setup (first frame). After receiving the FILS discovery frame, the STA transmits an association request frame being associated to association (second frame). At this point, when it is determined that an AP configuration change count (AP CCC) value carried by the STA is identical to (or the same as) the AP CCC value being included in the FILS discovery frame, the STA transmits an association request frame after including timestamp request information to the association request frame. After receiving the association request frame, as a response to the timestamp request, the AP transmits an association response frame including timestamp information (third frame) to the STA, and, then, the STA may establish synchronization with the AP by using the timestamp information of the AP.

Figure 7:
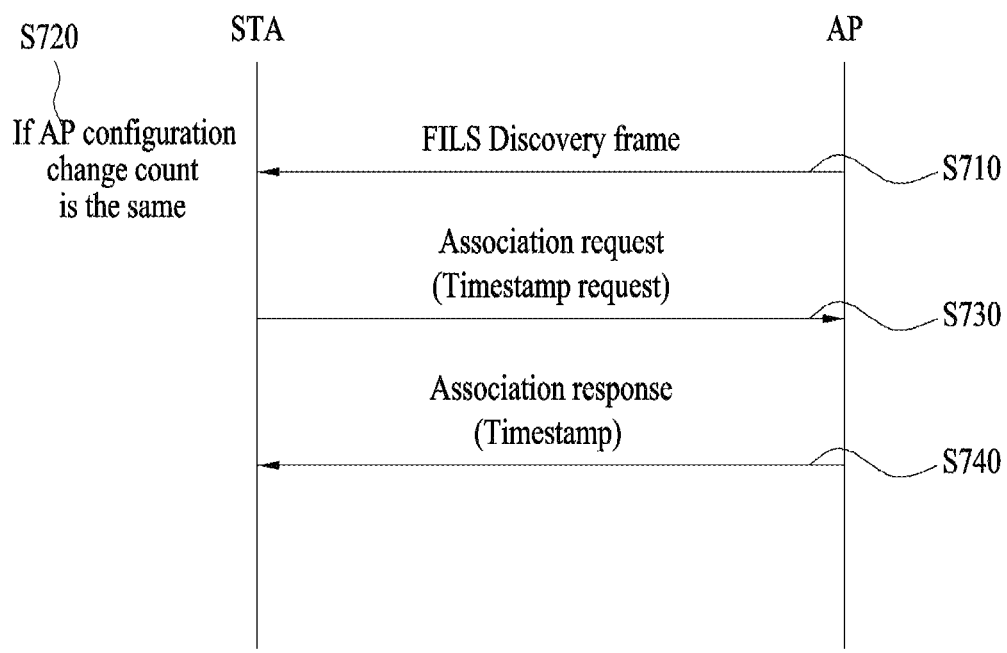
FIG. 7 illustrates an Association Request/Response operation according to an exemplary embodiment of the present invention.

FIG. 7 illustrates an Association Request/Response operation according to an exemplary embodiment of the present invention.

As shown in FIG. 7, the STA may receive a FILS discovery frame from the AP (S710). The FILS discovery frame may be periodically or aperiodically transmitted in-between beacon frames by the AP, and, as described above in Table 2, the FILS discovery frame may include a BSSID (Basic Service Set ID), a SSID (Service Set ID), a FD Capacity (FILS Discovery Capacity), a FD Security (FILS Discovery Security), an Access Network option, an AP Configuration Change Count (AP CCC), a next TBTT of the AP, a next TBTT of a neighboring AP, a GAS configuration sequence number, and so on.

The STA may compare the AP CCC value included in the FILS discovery frame, which is received from the AP, with the AP CCC value pre-stored in the STA itself (S720). Since the STA may receive FILS discovery frames from multiple APs, the STA may have an AP CCC list in a form of storing the AP CCC values respective to each AP.

The AP CCC value, which is described in the present invention, corresponds to a value indicating a change in the system information within the BSS. Accordingly, the AP CCC value is initially set to have a value of 0, and each time a change occurs afterwards, the value is incremented by 1. Therefore, the AP CCC (information) is used as an AP CCC value indicating a single value, and it is preferable that AP CCC is also understood as an element being included in the FILS discovery frame. Table 3 shown below illustrates an exemplary AP CCC element that is to be applied in the present invention.

TABLE 3

| Element ID | Length | AP Configuration Change Count |
|---|---|---|
| Octet: 1 | 1 | 1 |

As shown in Table 3, the AP CCC element may be configured of an Element ID field, a Length field, and an AP Configuration Change Count (AP CCC) field.

In the examples of Table 3, the Element ID field may be defined to have a length of 1 octet, and the Element ID field may also be configured as a value indicating that the corresponding IE corresponds to the AP CCC information. The Length field may be defined to have a length of 1 octet, and the Length field may be configured as a value indicating a length of a following field.

The AP CCC field may be defined to have a length of 1 octet, and the AP CCC field may be initially set to 0. It may also be possible to have the STA or AP set a value other than 0 as the initial value of the AP CCC field. The value of the AP CCC (field) may correspond to a version number of an AP Configuration Information Set. In case an update occurs in a non-dynamic information or element within a beacon frame or probe response frame, the value of the version number is incremented.

In case an update occurs in one or more elements within a probe response frame, the value of the AP CCC value may be incremented, and an update history of the AP CCC value may be stored in the form of an AP CCC list by the AP. Additionally, the number of AP CCC values may be limited within the AP CCC list.

In case dynamic information within the probe response frame is changed, the AP CCC value may be maintained without being incremented. The dynamic information may include one or more of Time Stamp, BSS load, Beacon timing, Time advertisement, BSS AC Access Delay, BSS Average Access Delay, BSS available admission capacity, and TPC Report element. Alternatively, in case an update becomes unnecessary due to the changed system parameter, the AP CCC value may also be maintained instead of being incremented.

After comparing the AP CCC value pre-stored in itself with the AP CCC value, which is included in the received FILS discovery field, in case the STA determines that the two AP CCC values are the same, the STA may transmit an Association Request frame to the AP (S730). Additionally, in order to establish synchronization with the AP, timestamp request information requesting for the time information of the AP may be included in this Association Request frame. Table 4 corresponds to a table showing an Association Request frame that is to be applied in the present invention.

TABLE 4

| Order | Information | Notes |
|---|---|---|
| Xx | Timestamp request | Timestamp request is optionally present, if dot11FILSActived is true. Timestamp request may be included when STA performs association request without beacon reception. |
| Last | Vendor Specific | One or more vendor-specific elements are optionally present. These elements follow all other elements. |

As shown in Table 4, the Association Request frame may include Timestamp request information, and this may be included in the Association Request frame, in case the Association Request is performed without receiving any beacon frame transmitted from the AP. Table 5 shown below corresponds to a table showing an example of a Timestamp request element that is to be applied in the present invention.

TABLE 5

| Element ID | Length | Timestamp request |
|---|---|---|
| Octet: 1 | 1 | 1 |

As shown in Table 5, the Timestamp request element may be configured of an Element ID field, a Length field, and a Timestamp request field.

In the examples of Table 5, the Element ID field may be defined to have a length of 1 octet, and the Element ID field may also be configured as a value indicating that the corresponding IE corresponds to the Timestamp request information. The Length field may be defined to have a length of 1 octet, and the Length field may be configured as a value indicating a length of a following field. The Timestamp request information may be defined to have a length of 1 octet.

After receiving the Association Request frame from the STA, as a response to the Association Request frame, the AP may transmit an Association Response frame to the STA (S740). The Association Request frame at this point may include Timestamp information. Alternatively, a Timing Synchronization Function timer may also be included herein. Since the STA has transmitted the Association Request frame without receiving any beacon frames, the AP is in a state when time synchronization is not established with the STA. Accordingly, in order to transmit time information of the AP to the STA, Timestamp information may be included in the Association Response frame. Table 6 shows an example of the Association Response frame that is to be applied in the present invention.

TABLE 6

| Order | Information | Notes |
|---|---|---|
| Xx | Timestamp or TSF timer | Timestamp or TSF timer is optionally present, if dot11FILSActived is true. Timestamp or TSF timer may be included when a Probe Response frame requesting Timestamp information is received. |
| Last | Vendor Specific | One or more vendor-specific elements are optionally present. These elements follow all other elements. |

As shown in Table 6, the Association Response frame may include Timestamp or TSF timer information, and this may be included in the Association Request frame, in case a request for Timestamp information is made from the STA. Table 7 shown below corresponds to a table showing an example of a Timestamp or TSF Timer element within the Association Response frame.

TABLE 7

| Element ID | Length | Timestamp or TSF Timer |
|---|---|---|
| Octet: 1 | 1 | 8 |

As shown in Table 7, the Timestamp or TSF Timer element may be configured of an Element ID field, a Length field, and a Timestamp field or a TSF Timer field.

In the examples of Table 7, the Element ID field may be defined to have a length of 1 octet, and the Element ID field may also be configured as a value indicating that the corresponding IE corresponds to the Timestamp or TSF Timer information. The Length field may be defined to have a length of 1 octet, and the Length field may be configured as a value indicating a length of a following field. The Timestamp field or TSF Timer field may be defined to have a length of 8 octets.

Embodiment 2

Unlike in Embodiment 1, Embodiment 2 proposes a method for establishing synchronization between the STA and the AP, by having the STA receive a FILS discovery frame and by having the STA receive a beacon frame and use the received beacon frame.

In order to establish synchronization with the AP, the STA receives a FILS discovery frame (first frame) from the AP, and, in order to establish association with the AP, the STA transmits an Association Request frame (second frame) to the AP, and, then, the STA receives an Association Response frame (third frame) from the AP. The STA receives a beacon frame including Timestamp information (fourth frame) from the AP, and, by using the timestamp information included in the received beacon frame, the STA may establish synchronization with the AP.

In case of Embodiment 2, since a beacon frame is received, and since Timestamp information is included in the beacon frame, Timestamp information may not be separately requested. Therefore, in this exemplary embodiment, the significant element corresponds to at which point the beacon frame is being received.

Embodiment 2-1

Figure 8:
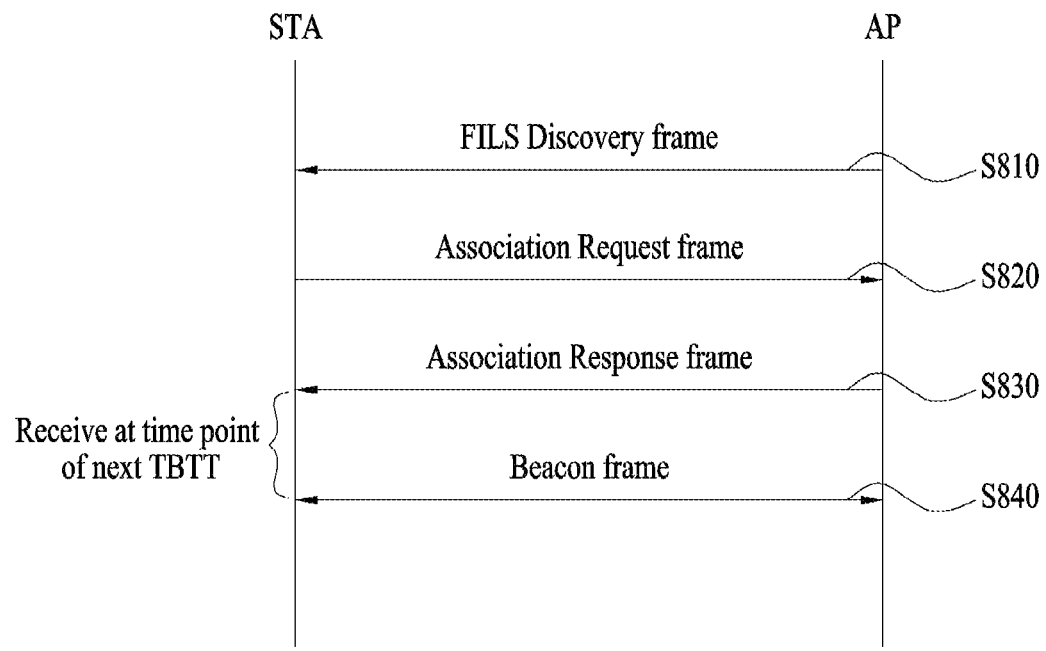
FIG. 8 illustrates an Association Request/Response operation according to another exemplary embodiment of the present invention.

FIG. 8 illustrates an Association Request/Response operation according to another exemplary embodiment of the present invention.

As shown in FIG. 8, the STA receives a beacon frame from the AP. Accordingly, a series of process steps up to the point of receiving the beacon frame will hereinafter be described. First of all, the STA may receive a FILS discovery frame from the AP (S810). The FILS discovery frame may be periodically or aperiodically transmitted in-between beacon frames by the AP, and the FILS discovery frame may include a BSSID (Basic Service Set ID), a SSID (Service Set ID), a FD Capacity (FILS Discovery Capacity), a FD Security (FILS Discovery Security), an Access Network option, an AP Configuration Change Count (AP CCC), a next TBTT of the AP, a next TBTT of a neighboring AP, a GAS configuration sequence number, and so on. Additionally, the Association Request frame may include information related to diverse capabilities, and information on beacon listen interval, SSID (service set identifier), supported rates, supported channels, RSN, mobility domain, supported operating classes, TIM broadcast request (Traffic Indication Map Broadcast request), interworking service capability, and so on.

In order to establish synchronization with the AP, the STA may transmit an Association Request frame to the AP (S820). Unlike in Embodiment 1, the Association Request frame at this point does not include timestamp request information in the Association Request frame. After receiving the Association Request frame, the AP may transmit an Association Response frame including information related to the Association to the STA (S830).

For example, the Association Response frame may include information related to diverse capabilities, and information, such as status code, AID (Association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, and so on.

The STA may receive the Association Response frame and may then complete the association with the AP. However, in this case, since there is no synchronization process between the AP and the STA, a synchronization process is required to be performed.

In case the STA does not establish synchronization with the AP until the association is completed, the STA may receive a beacon frame at a next TBTT (next Target Beacon Transmission Time) time point of the AP (S840). The STA, which has received the FILS discovery frame, may know the next TBTT that is included in the FILS discovery frame. Accordingly, the STA is aware of the time point at which the beacon frame is being transmitted (e.g., broadcasted) by the AP. The STA may receive the beacon frame and may use the Timestamp information of the AP, which is included in the received beacon frame, so as to establish synchronization with the AP.

Embodiment 2-2

Figure 9:
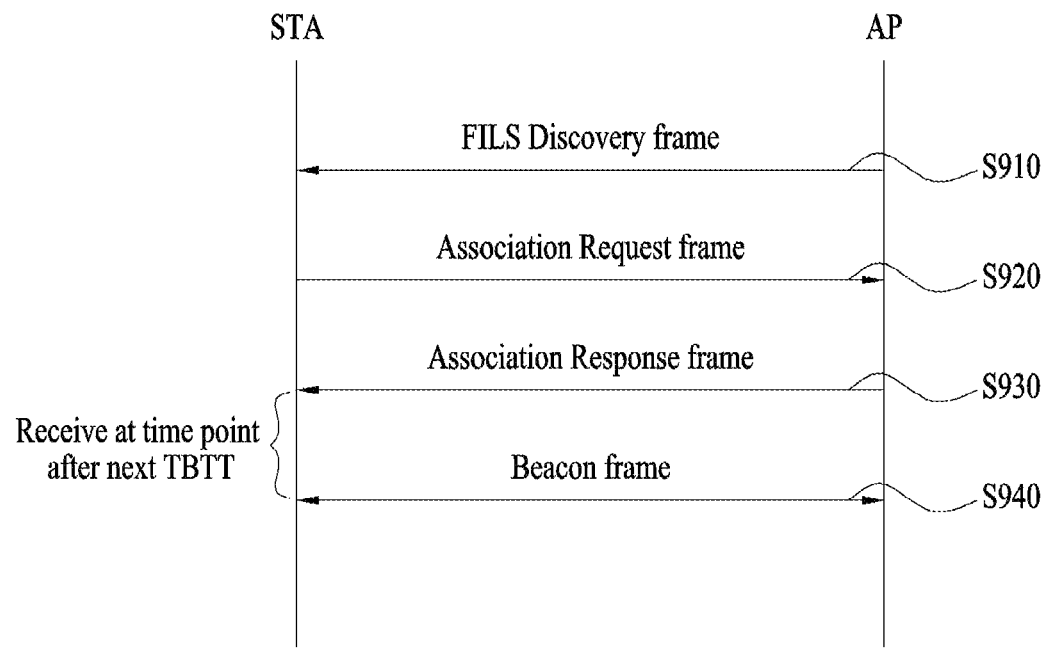
FIG. 9 illustrates an Association Request/Response operation according to yet another exemplary embodiment of the present invention.

FIG. 9 illustrates an Association Request/Response operation according to yet another exemplary embodiment of the present invention.

As shown in FIG. 9, the STA may receive a FILS discovery frame from the AP (S910). After receiving the FILS discovery frame, in order to establish association with the AP, the STA may transmit an Association Request frame to the AP (S920). The Association Request frame at this point does not include timestamp request information in the Association Request frame, just as in Embodiment 2-1. After receiving the Association Request frame, the AP may transmit an Association Response frame including information related to association to the STA (S930).

In case the STA does not establish synchronization with the AP until the association is completed, although it may be advantageous for a fast link setup to receive a beacon frame at a next TBTT time point of the AP, in case the next TBTT has elapsed, the next TBTT becomes insignificant information for receiving the beacon frame. Therefore, after the next TBTT has elapsed, the beacon frame may be received at the reception time point of the beacon frame (S940). A case when the STA has shifted to the power saving mode immediately after the association with the AP may correspond to this. After receiving the FILS discovery frame, the STA may know the next TBTT that is included in the FILS discovery frame. Accordingly, the STA is aware of the time point at which the beacon frame is being transmitted (e.g., broadcasted) by the AP. Additionally, by calculating based upon a beacon interval respective to the corresponding AP and the next TBTT time point, which are stored in advance in the STA, the STA may acquire the beacon reception time point. The STA may receive the beacon frame at a beacon frame reception time point following the elapse of the next TBTT, and, then, the STA may use the Timestamp information of the AP, which is included in the received beacon frame, so as to establish synchronization with the AP.

The Timestamp request information, which is defined above, may also be transmitted through another frame, which is transmitted by the STA to the AP, instead of the association request frame, and the AP may include the Timestamp or TSF timer in the response frame and transmit the Timestamp or TSF timer to the AP.

Figure 10:
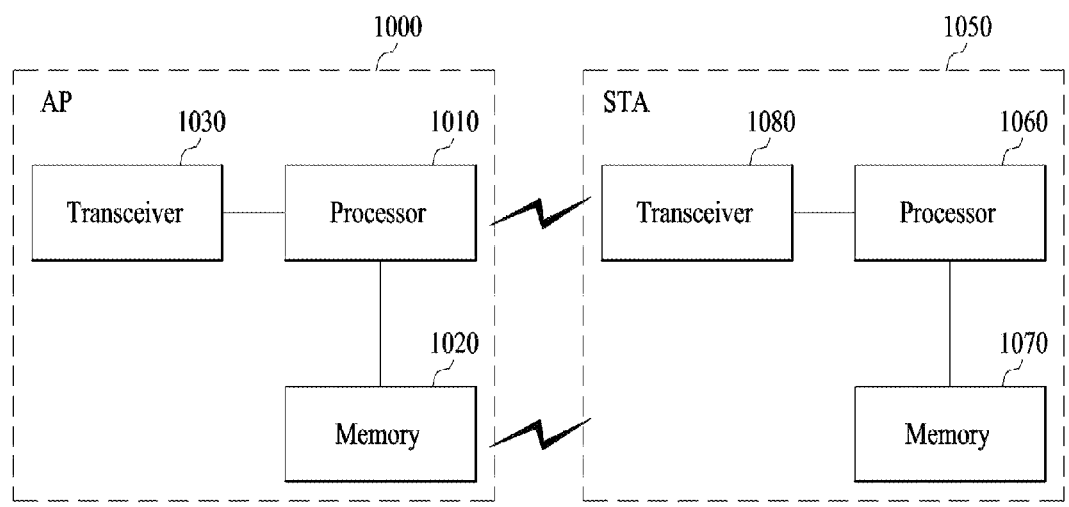
FIG. 10 illustrates a block view showing exemplary configurations of an AP device and a device of a STA according to an exemplary embodiment of the present invention.

FIG. 10 illustrates a block view showing exemplary configurations of an AP device (or base station device) and a STA device (or user equipment device) according to an exemplary embodiment of the present invention.

The AP (1000) may include a processor (1010), a memory (1020), and a transceiver (1030). The STA (1050) may include a processor (1060), a memory (1060), and a transceiver (1070).

The transceiver (1030 and 1080) may transmit/receive radio signals and may, for example, embody a physical layer according to the IEEE 802 system.

The processor (1010 and 1060) may be connected to the transceiver (1030 and 1080) and may embody a physical layer and/or MAC Layer according to the IEEE 802 system. The processor (1010 and 1060) may be configured to perform operations respective to one of or a combination of two or more of the diverse above-described exemplary embodiments of the present invention.

Additionally, a module that realizes the operations of the AP and the STA according to the diverse above-described exemplary embodiments of the present invention may be stored in the memory (1020 and 1070) and may be executed by the processor (1010 and 1060). The memory (1020 and 1070) may be included in the inside of the processor (1010 and 1060) or may be installed on the outside of the processor (1010 and 1060), thereby being connected to the processor (1010 and 1060) through the disclosed means.

The description of the above-described AP device (1000) and STA device (1050) may be respectively applied to each of the base station device and the user equipment device of another wireless communication system (e.g., LTE/LTE-A system).

The detailed configuration of the above-described AP and STA devices may be embodied so that the detailed described in the above-described diverse exemplary embodiments of the present invention can be independently applied, or so that 2 or more exemplary embodiments can be simultaneously applied, and description of overlapping parts will be omitted for simplicity.

The above-described exemplary embodiments of the present invention may be embodied through diverse means. For example, the exemplary embodiments of the present invention may be embodied as hardware, firmware, software, or their combination.

If the embodiment according to the present invention is embodied as hardware, the method according to the exemplary embodiments of the present invention may be realized by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

If the embodiment according to the present invention is embodied as firmware or software, the method according to the exemplary embodiments of the present invention may be realized as a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Among the elements of the device for such AP/STA, the structure of the processor (1010 and 1060) will hereinafter be described in more detail.

Figure 11:
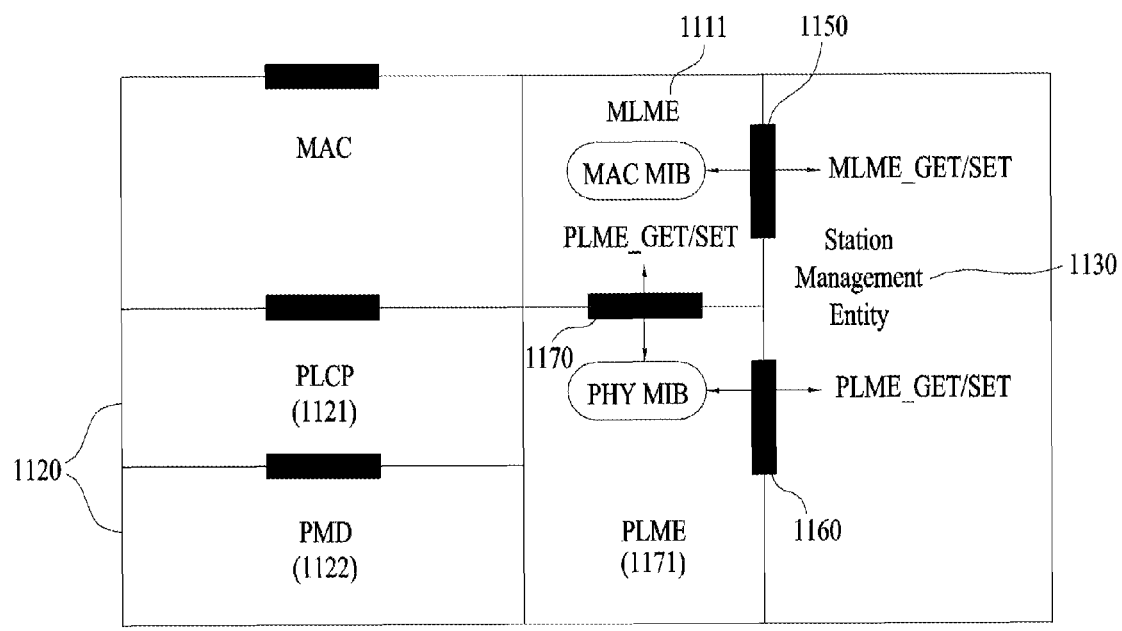
FIG. 11 illustrates an exemplary structure of a processor of an AP device or STA device according to an exemplary embodiment of the present invention.

FIG. 11 illustrates an exemplary structure of a processor of an AP device or STA device according to an exemplary embodiment of the present invention.

The processor (1010 or 1060) of the AP or STA of FIG. 10 may have a structure of multiple layers, and FIG. 11 particularly focuses its illustration on a MAC sublayer (1110) and a physical layer (1120) within a DLL (Data Link Layer) among such multiple layers. As shown in FIG. 11, the PHY (1120) may include a PLCP (Physical Layer Convergence Procedure) entity (1421) and a PMD (Physical Medium Dependent) entity (1122). Each of the MAC sublayer (1110) and the PHY (1120) includes a management entity that is conceptually referred to as a MLME (MAC sublayer Management Entity) (1111). Such entities (1111, 1121) respectively provide a layer management service interface in which a layer management function operates.

In order to provide accurate MAC operations, a SME (Station Management Entity) (1130) exists in each STA. The SME (1130) corresponds to a layer-independent entity, which may appear to exist in a separate management plane or to exist off to the side. Although the accurate functions of the SME (1130) are not described in detail in this document, generally, it may seem that such entity (1130) performs functions, such as collecting layer-dependent status from diverse layer management entities (LMEs), similarly setting up values of layer-specific parameters. The SME (1130) may generally perform such functions on behalf of a generate system management entity and may realize a standard management protocol.

The entities shown in FIG. 11 may interact (or interoperate) with one another by using diverse methods. FIG. 11 shows several examples of exchanging GET/SET primitives. A XX-GET.request primitive is used for requesting a value of a given MIB attribute (management information based attribute information). A XX-GET.confirm primitive is used for returning an adequate MIB attribute information value, when its status is "Successful", and, otherwise, the XX-GET.confirm primitive is used for returning an error indication from a Status field. A XX-SET.request primitive is used for requesting the indicated MIB attribute to be set to a given value. In case the MIB attribute signifies a specific operation, this requests for the corresponding operation to be performed. Additionally, a XX-SET.confirm primitive is used for verifying that the indicated MIB attribute has been set to the requested value, when its status is "Successful", and, otherwise, the XX-SET.confirm primitive is used for returning an error indication to a Status field. In case the MIB attribute signifies a specific operation, this verifies that the corresponding operation has been performed.

As shown in FIG. 11, the MLME (1111) and the SME (1130) may exchange diverse MLME_GET/SET primitives through a MLME_SAP (1150). Additionally, as shown in FIG. 11, a plurality of PLCM_GET/SET primitives may be exchanged between a PLME (1121) and the SME (1130) through a PLME_SAP (1170) and may be exchanged between the MLME (1111) and the PLME (1170) through the PLME_SAP (1170).

As described above, a detailed description of the preferred mode for carrying out the present invention disclosed herein is provided so that anyone skilled in the art can be capable of realizing and performing the present invention. Although the description provided above is described with reference to the preferred mode for carrying out the present invention, it will be apparent to those skilled in the art that the present invention may be diversely corrected and modified without departing from the spirit and scope of the present invention, which are disclosed in the appended claims of the present invention disclosed below. Therefore, the present invention will not be limited only to the exemplary embodiments disclosed herein. Instead, the present invention seeks to provide a broader scope of the present invention best fitting the disclosed principles and new characteristics of the invention described herein.

INDUSTRIAL APPLICABILITY

Although the above-described diverse exemplary embodiment according to the present invention are described based upon the IEEE 802.11 system, the exemplary embodiments may also be applied to other diverse mobile communication systems by using the same method.

What is claimed is:

1. A method of performing link setup with an access point (AP) by a station (STA) in a wireless communication system, the method comprising:
receiving a first frame related to link setup from an AP;
wherein the first frame is a fast initial link setup (FILS) discovery frame,
transmitting a second frame related to association to the AP;
receiving a third frame from the AP as a response to the second frame; and
synchronizing with the AP and performing the association with the AP,
wherein if the second frame includes a timestamp request information, and an AP configuration change count (CCC) value of the STA is identical to an AP CCC value included in the received first frame, the third frame includes at least one or more of timestamp information and Timing Synchronization Function (TSF) information of the AP, and the STA and the AP are synchronized by the third frame without receiving a fourth frame,
wherein if the second frame does not include the timestamp request information, a fourth frame including Timestamp information is received from the AP, and the STA and the AP are synchronized, and
wherein the fourth frame is the beacon frame.

2. The method of claim 1, wherein the second frame is an Association Request frame, and the third frame is an Association Response frame.

3. The method of claim 1, wherein the fourth frame is received by the STA at a next Target Beacon Transmission Time (TBTT) of the AP.

4. The method of claim 1, wherein the fourth frame is received by the STA at a beacon frame reception time point after a next TBTT of the AP.

5. The method of claim 4, wherein the beacon frame reception time point after the next TBTT of the AP corresponds to a time point that is acquired by calculating a reception point of a beacon frame transmitted by the AP based upon a Beacon interval and a next TBTT respective to the corresponding AP that are pre-stored in the STA.

6. The method of claim 5, wherein the STA shifts to a Power Saving mode immediately after establishing association with the AP.

7. A station (STA) device performing link setup in a wireless communication system, the STA device comprising comprises:
a transceiver; and
a processor that:
controls the transceiver to receive a first frame related to link setup from an access point (AP), wherein the first frame is a fast initial link setup (FILS) discovery frame,
controls the transceiver to transmit a second frame related to association to the AP, controls the transceiver to receive a third frame from the AP as a response to the second frame and, synchronizes with the AP and performs the association with the AP,
wherein if the second frame includes a timestamp request information, and an AP configuration change count (CCC) value of the STA is identical to an AP CCC value included in the received first frame, the third frame includes at least one or more of timestamp information and Timing Synchronization Function (TSF) information of the AP, and the STA and the AP are synchronized by the third frame without receiving a fourth frame,
wherein if the second frame does not include the timestamp request information, a fourth frame including Timestamp information is received from the AP, and the STA and the AP are synchronized, and
wherein the fourth frame is the beacon frame.

* * * * *